United States Patent
Lee (10) Patent No.: US 11,301,064 B2
(45) Date of Patent: Apr. 12, 2022

(54) POINTING DEVICES AND METHODS FOR PROVIDING AND INHIBITING USER INPUTS TO A COMPUTING DEVICE

(71) Applicant: RAZER (ASIA-PACIFIC) PTE. LTD., Singapore (SG)

(72) Inventor: Kah Yong Lee, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/612,617

(22) PCT Filed: May 12, 2017

(86) PCT No.: PCT/SG2017/050250
§ 371 (c)(1),
(2) Date: Nov. 11, 2019

(87) PCT Pub. No.: WO2018/208224
PCT Pub. Date: Nov. 15, 2018

(65) Prior Publication Data
US 2020/0201453 A1    Jun. 25, 2020

(51) Int. Cl.
*G06F 3/038* (2013.01)
*G06N 20/00* (2019.01)
*G06F 3/0354* (2013.01)

(52) U.S. Cl.
CPC .......... *G06F 3/0383* (2013.01); *G06F 3/0354* (2013.01); *G06N 20/00* (2019.01)

(58) Field of Classification Search
CPC ........ G06F 3/03; G06F 3/0304; G06F 3/0308; G06F 3/0312; G06F 3/033; G06F 3/0346; G06F 3/0354; G06F 3/03541; G06F 3/03544; G06F 3/03549; G06F 3/0362; G06F 3/0383
(Continued)

(56) References Cited

U.S. PATENT DOCUMENTS 5,598,187 A * 1/1997 Ide ..................... G06F 3/0346
345/156
5,825,350 A   10/1998 Case, Jr. et al.
(Continued)

FOREIGN PATENT DOCUMENTS

CN    104020863 A    9/2014
WO    WO 2010/013926 A2    4/2010

OTHER PUBLICATIONS

Extended European Search Report dated Feb. 21, 2020, 9 pages, for the corresponding European Patent Application No. 17909182.2.
(Continued)

*Primary Examiner* — Alexander Eisen
*Assistant Examiner* — Nelson Lam
(74) *Attorney, Agent, or Firm* — Polsinelli PC (57) ABSTRACT

According to various embodiments, there is provided a pointing device for communicating with a computing device, the pointing device including: a switch operable to generate a control signal; a motion sensor configured to generate spatial data based on movements of a moveable part of the pointing device; a controller configured to inhibit transmission of the spatial data to the computing device, during a predetermined time interval immediately following a state change in the control signal.

19 Claims, 6 Drawing Sheets

(58) Field of Classification Search
USPC .................................................. 345/156–167
See application file for complete search history.

(56) References Cited

U.S. PATENT DOCUMENTS

| | | | |
|---|---|---|---|
| 6,084,572 A | 7/2000 | Yaniger et al. | |
| 6,650,313 B2 | 11/2003 | Levine et al. | |
| 7,161,578 B1* | 1/2007 | Schneider | G06F 3/03545 |
| | | | 345/156 |
| 7,194,702 B1 | 3/2007 | Peasley | |
| 7,333,087 B2 | 2/2008 | Soh et al. | |
| 7,629,961 B2 | 12/2009 | Casebolt et al. | |
| 9,250,717 B2 | 2/2016 | Truong | |
| 9,323,354 B2 | 4/2016 | Westerman et al. | |
| 9,696,859 B1* | 7/2017 | Heller | G06F 1/1686 |
| 2001/0033267 A1* | 10/2001 | Kim | G06F 1/1656 |
| | | | 345/156 |
| 2004/0119682 A1 | 6/2004 | Levine et al. | |
| 2005/0008148 A1 | 1/2005 | Jacobson | |
| 2005/0174324 A1 | 8/2005 | Liberty et al. | |
| 2006/0164393 A1 | 7/2006 | Wu et al. | |
| 2006/0274042 A1 | 12/2006 | Krah et al. | |
| 2007/0176896 A1* | 8/2007 | Gritton | G06F 3/0231 |
| | | | 345/157 |
| 2007/0262243 A1* | 11/2007 | cheah | G06F 1/3215 |
| | | | 250/214 R |
| 2007/0268246 A1* | 11/2007 | Hyatt | G06F 1/1694 |
| | | | 345/156 |
| 2010/0103108 A1 | 4/2010 | Hotelling et al. | |
| 2010/0141577 A1* | 6/2010 | Moritaku | G06F 3/0383 |
| | | | 345/157 |
| 2011/0122062 A1* | 5/2011 | Chung | G06F 3/0383 |
| | | | 345/158 |
| 2011/0148762 A1* | 6/2011 | Hatambeiki | G06F 3/041 |
| | | | 345/158 |
| 2011/0260968 A1* | 10/2011 | Ye | G06F 3/0346 |
| | | | 345/158 |
| 2012/0007713 A1* | 1/2012 | Nasi | G06F 3/017 |
| | | | 340/5.81 |
| 2013/0057472 A1* | 3/2013 | Dizac | G06F 3/0346 |
| | | | 345/163 |
| 2013/0257725 A1* | 10/2013 | Hwang | G06F 3/017 |
| | | | 345/158 |
| 2014/0092011 A1* | 4/2014 | De Foras | G06F 3/017 |
| | | | 345/157 |
| 2014/0104156 A1* | 4/2014 | Touma | G06F 3/04815 |
| | | | 345/156 |
| 2014/0145955 A1* | 5/2014 | Gomez | G06F 3/038 |
| | | | 345/163 |
| 2015/0049021 A1* | 2/2015 | Cheng | G06F 3/0325 |
| | | | 345/163 |
| 2017/0092118 A1* | 3/2017 | Choi | H04N 21/42222 |
| 2019/0346907 A1* | 11/2019 | Kabasawa | G01C 17/28 |
| 2020/0409478 A1* | 12/2020 | Shastri | G06F 3/038 |
| 2021/0089142 A1* | 3/2021 | Liou | G06F 3/0383 |

OTHER PUBLICATIONS

International Search Report and Written Opinion, dated Jan. 30, 2018, for the corresponding International Application No. PCT/SG2017/050250 in 12 pages.
Levine, J. L., & Schappert, M. A. A mouse adapter for people with hand tremor. IBM Systems Journal, 2005, 44(3), 621 -628. (Abstract).
The SteadyMouse Project, www.steadymouse.com, 2 pages.

* cited by examiner

POINTING DEVICES AND METHODS FOR PROVIDING AND INHIBITING USER INPUTS TO A COMPUTING DEVICE

TECHNICAL FIELD

Various embodiments relate to pointing devices and methods for providing user inputs to a computing device.

BACKGROUND

Pointing devices may be computer peripheral devices used to provide spatial data to computers. Examples of pointing devices may include computer mice, joysticks, track balls and game controllers. A pointing device may sense a movement of a user's hand and translate the movement of the user's hand into spatial data for sending to the computer. The user may move the pointing device to shift the position of a cursor in the graphical user interface (GUI) of the computer. The computer may adjust the position of the cursor based on the spatial data received from the pointing device. The pointing device may also include a clickable button. When the user clicks the button, the pointing device may sense a movement of the user's hand and thereby transmit spatial data to the computer, even if the user did not intend to adjust the position of the cursor.

SUMMARY

According to various embodiments, there may be provided a pointing device for communicating with a computing device, the pointing device including: a switch operable to generate a control signal; a motion sensor configured to generate spatial data based on movements of a moveable part of the pointing device; a controller configured to inhibit transmission of the spatial data to the computing device, during a predetermined time interval immediately following a state change in the control signal.

According to various embodiments, there may be provided a method for providing user inputs to a computing device, the method including: generating a control signal using a switch of a pointing device; generating spatial data based on movements of a moveable part of the pointing device, using a motion sensor; inhibiting transmission of the spatial data to the computing device during a predetermined time interval immediately following a state change in the control signal, using a controller.

According to various embodiments, there may be provided a non-transitory computer-readable medium including instructions which, when executed by a processor, causes the processor to perform a method for providing user inputs to a computing device, the method including: generating a control signal using a switch of a pointing device; generating spatial data based on movements of a moveable part of the pointing device, using a motion sensor; inhibiting transmission of the spatial data to the computing device during a predetermined time interval immediately following a state change in the control signal.

According to various embodiments, there may be provided a non-transitory computer-readable medium including instructions which, when executed by a computer, causes the computer to perform a method for receiving user inputs from a pointing device, the method including: receiving a control signal from the pointing device; receiving spatial data from the pointing device; translating the received spatial data into a position of a cursor, except when the received spatial data correspond to a predetermined time interval immediately following a state change in the control signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification, the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any conventional devices in this specification is not, and should not be taken as an acknowledgement or any form of suggestion that the referenced conventional devices forms part of the common general knowledge in Australia (or any other country).

In order that the invention may be readily understood and put into practical effect, various embodiments will now be described by way of examples and not limitations, and with reference to the figures.

In the context of various embodiments, the word "pointer" may be but is not limited to being interchangeably referred to as a "cursor".

In the context of various embodiments, the phrase "computer mouse" may be but is not limited to being interchangeably referred to as a "mouse".

In the context of various embodiments, the phrase "spatial data" may be but is not limited to being interchangeably referred to as a "positional data".

A computer mouse may translate movements of the body of the computer mouse across a tracking surface into positional data and may send the positional data to a computing device. The computing device may adjust a position of a cursor based on the positional data. When a user clicks a button on the computer mouse, the computer mouse may shift slightly in position, causing an unintentional shift in the cursor. When the user releases the button, the computer mouse may shift slightly in position again, causing another unintentional shift in the cursor. The unintentional shift in position of the computer mouse may be caused by the stiffness or resiliency of the switch underneath the button. Also, the user's hand may move sideways a little when the user's index finger moves to depress the button, thereby shifting the computer mouse in the plane of the tracking surface. The unintentional shift in the cursor may be undesirable in applications that require precise control, for example illustrations, graphics design and gaming. According to various embodiments, a method may be provided to eliminate the unintentional shift in the cursor. The method may temporarily freeze the transmission of positional data from the computer mouse to the computing device, right after the button is clicked and right after the button is released. During the temporary freeze periods, the positional data may be stowed away in a memory of the computer mouse, without being sent to the computing device. After the temporary freeze period, the computer mouse may determine whether there are further movements of the computer mouse, or the computer mouse was continuously moving from the time of the button click till after the temporary freeze. If there are further movements after the temporary freeze or if the computer mouse was continuously moving after the click, the user may be intentionally moving the computer mouse, for example, if the user is performing a drag-and-drop operation in the GUI, or illustrating freehand in a graphics application. In such scenarios, the computer mouse may retrieve the stowed away positional data that corresponds to movements of the computer mouse during the temporary freeze period, and send the retrieved data to the computing device. The computing device may then adjust the position of the cursor as if the temporary freeze had not occurred. The user experience may be enhanced, since the cursor position may be accurate according to the user's intentions. The method may be simple to implement, as it only relies on a time-based blocking window to eliminate the unintentional mouse movement. The method may be implemented without any specialized sensors or hardware components, although it may supplemented with those sensors. The method may be implemented in the computer mouse or alternatively, implemented in the computing device to work with any generic pointing devices.

Figure 1:
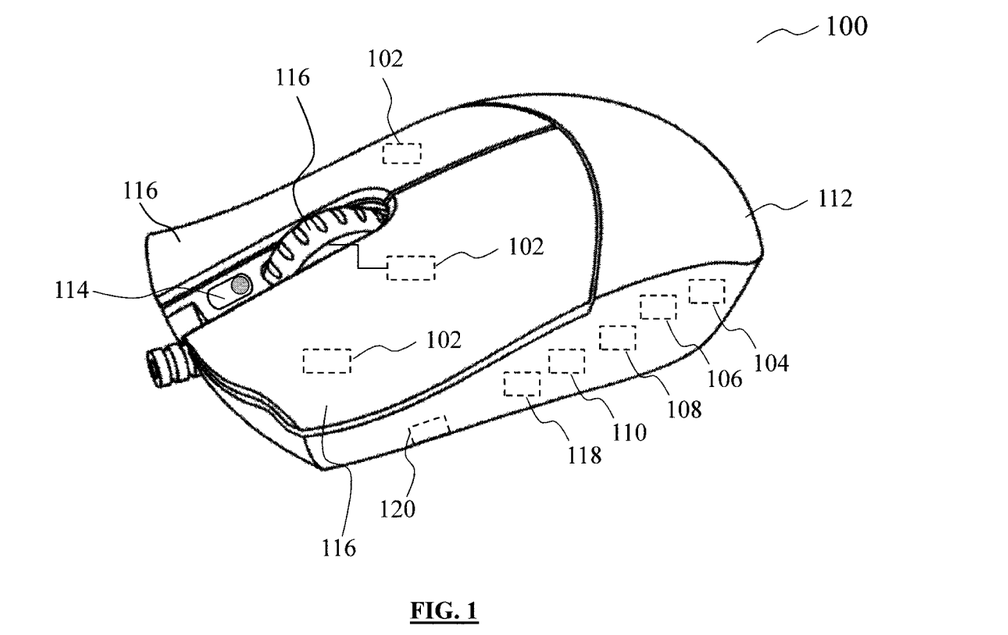
FIG. 1 shows an example of a pointing device according to various embodiments.

FIG. 1 shows an example of a pointing device 100 according to various embodiments. The pointing device in FIG. 1 may be a computer mouse. The pointing device 100 may be communicatively couplable to a computing device such as a personal computer, a gaming console or a television. The pointing device 100 may be coupled to the computing device via a data transfer means. The data transfer means may be a wired data connector, in other words a data cable. Examples of data cables may include Universal Serial Bus cable, PS/2 cable and IEEE 1394 (FireWire) cable. The data transfer means may also be wireless, such as radio waves or optical signals. The data transfer means may include a transmitter 110 configured to transmit data from the pointing device 100 to the computing device. The transmitter 110 may be a radio device configured to transmit any one of Bluetooth, WiFi, ZigBee, infrared, Li-Fi or any dedicated frequency channel. The transmitter 110 may also be a wired data connector. The transmitter may also be a circuit or processor within the pointing device 100, that sends data to the data transfer means. The pointing device 100 may include a housing 112. The housing 112 may encase the internal components of the pointing device 100. The internal components may include a switch 102, a motion sensor 104 and a controller 106. The internal components may further include at least one of a memory 108, a transmitter 110 and a self-learning processor 118. The internal components are illustrated in dashed lines in FIG. 1 to indicate that they may not be visible by virtue of being enclosed in the housing 112. The positions of the various internal components shown in FIG. 1 are merely illustrative and are not limiting as to the position of the internal components. The pointing device 100 may further include at least one button 116 configured to receive an external force exerted by a user, and further configured to translate the external force into actuating the switch 102. The button may be any one of a left button, a right button or a scroll wheel. The user may operate any one of the buttons 116 to provide a user input, for example, to make a selection or to execute an action in a computer application being run on the computing device. Each button 116 may be coupled to a respective switch 102 such that when the button is operated, for example by clicking or depressing the button, the respective switch 102 is activated. The respective switch 102 may detect whether the button 116 is depressed or not depressed, by generating electrical signals when the button 116 is clicked, or generating electrical signals that are indicative of the displacement of the button 116. The electrical signal generated by the switch 102 may also be referred herein as the control signal. The button 116 may be prevented from activating the switch 102 in its rest position when no external force is exerted, by a biasing means such as a spring. The pointing device 100 may also include a user interface 114. The user interface 114 may be one of the buttons 116, or may be a dedicated button or selector. The user interface 114 may be used to indicate an operating mode of the pointing device 100. Alternatively, the user interface 114 may be a software module residing in the memory 108 that may launch a selection menu on a graphical user interface of the computing device, for receiving the user's selection of the operating mode.

The pointing device 100 may be any one of a mechanical mouse, an optical mouse or an inertial mouse. The motion sensor 104 may be configured to sense movements of the pointing device 100 or the housing 112. In the example of the pointing device 100, the user may grasp the housing 112 in his hand and move the pointing device 100 across a tracking surface, such as a mouse pad or a desk surface, to control the position of a cursor in the graphical user interface displayed by the computing device. Thus, the relevant movements of the pointing device 100 may be in a plane of the tracking surface. The movements of the pointing device 100 in the plane of the tracking surface may also be referred herein as (x,y) movements. The motion sensor 104 may detect the relevant movements and translate the detected movements into data indicative of the trajectory of the pointing device 100, also referred herein as spatial data. The motion sensor 104 may include at least one of a mechanical tracker, an optical tracker, a gyroscope or an accelerometer.

The controller 106 may be a control circuit, such as an analogue circuit or a digital circuit. Alternatively, the controller 106 may be a processor, or may be a software module executable by a processor. The controller 106 will be described in further details in subsequent paragraphs.

The self-learning processor 118 may be a self-learning circuit. Alternatively, the self-learning processor may be a processor, or may be a software module executable by a processor. The self-learning processor 118 may include machine-learning algorithms. The self-learning processor 118 will be described in further details in subsequent paragraphs.

The memory 108 may be configured to store the spatial data generated by the motion sensor 104. The memory 108 may also store software modules of the pointing device 100, for example driver software. In embodiments where the controller 106 or the self-learning processor 118 is a software module, the memory 108 may also store the controller 106 or the self-learning processor 118. The memory 108 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

The pointing device 100 may further include a surface identifier 120. The surface identifier 120 may be configured to identify the tracking surface on which the housing 112 moves across. The surface identifier 120 may include an image recognizer configured to recognize the tracking surface through visual means. The image recognizer may include an image capturing tool such as a camera, that takes pictures of the tracking surface. The image recognizer may further include an image processing algorithm that matches the pictures against a library of known tracking surfaces, to recognize the tracking surface. The surface identifier 120 may also identify the tracking surface based on patterns in the accumulated spatial data or the movements sensed by the motion sensor 104. For example, the spatial data collected within a nominal masking window may be within a first range when the pointing device 100 is moved across a mouse pad. The spatial data collected within the same nominal masking window may fall into a second range that is outside of the first range, when the pointing device 100 is moved across a desk surface.

Figure 2:
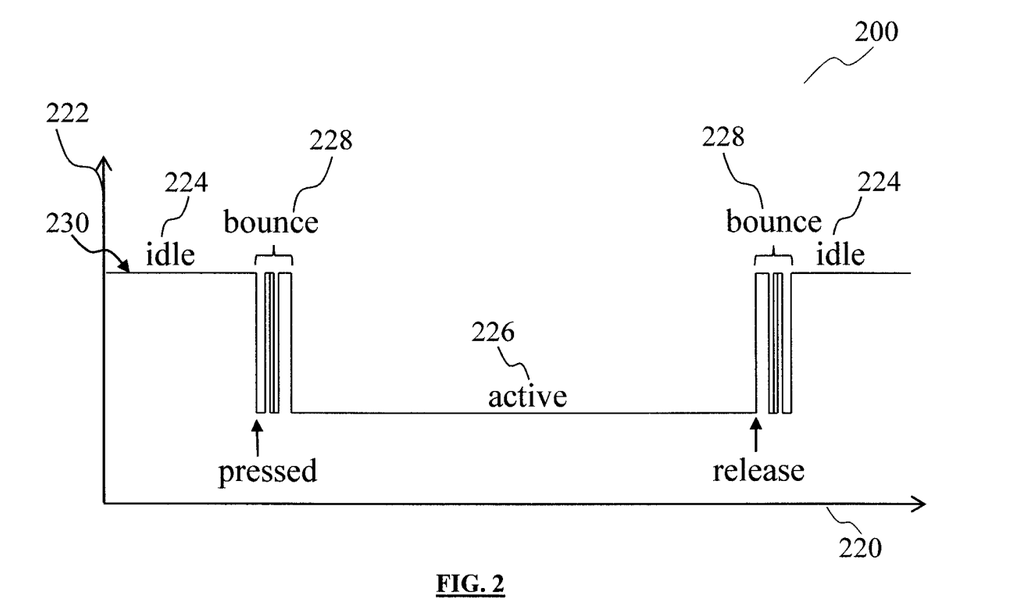
FIG. 2 shows a signal diagram showing the control signal generated by the switch when the button is operated, according to various embodiments.

FIG. 2 shows a signal diagram 200 showing the control signal 230 generated by the switch 102 when the button 116 is operated, according to various embodiments. The signal diagram 200 includes horizontal axis 220 indicating time, and vertical axis 222 indicating amplitude of the control signal 230. The control signal 230 may be a voltage signal. The control signal 230 may be an analogue signal. When the switch 102 is un-actuated, i.e. in the idle state 224, the control signal 230 may be high in amplitude. When the switch 102 is actuated, for example by pressing the button 116, the control signal 230 may transit to an active state 226 where the control signal 230 may be low in amplitude. When the switch 102 is deactivated, for example when the button 116 is released, the control signal 230 may return to the idle state 224. However, the transition from the idle state 224 to the active state 226, as well as the transition from the active state 226 to the idle state 224 may not be instantaneous. In between the two states, the control signal 230 may fluctuate, i.e. bounce. The fluctuations are indicated in the signal diagram 200 as bounce 228. The switch 102 may be for example, a tactile switch. The switch 102 may include more than one electrical contact. The electrical contacts may be biased against contacting each other. When the switch 102 is actuated, for example by exerting an external force to overcome the biasing force acting on the electrical contacts, the electrical contacts may touch and thereby activate the switch 102. The biasing force may be provided by springs or may be a result of the elasticity of the material of the electrical contacts. The biasing force may cause the electrical contacts to make and break contact several times when the switch 102 is operated, causing the bounce 228, before the electrical contacts become firmly in contact. Similarly, when the switch 102 is deactivated, the biasing force may cause the electrical contacts to make and break contact several times, causing the bounce 228 in the control signal 230 before the electrical contacts settle back to their rest positions.

Figure 3:
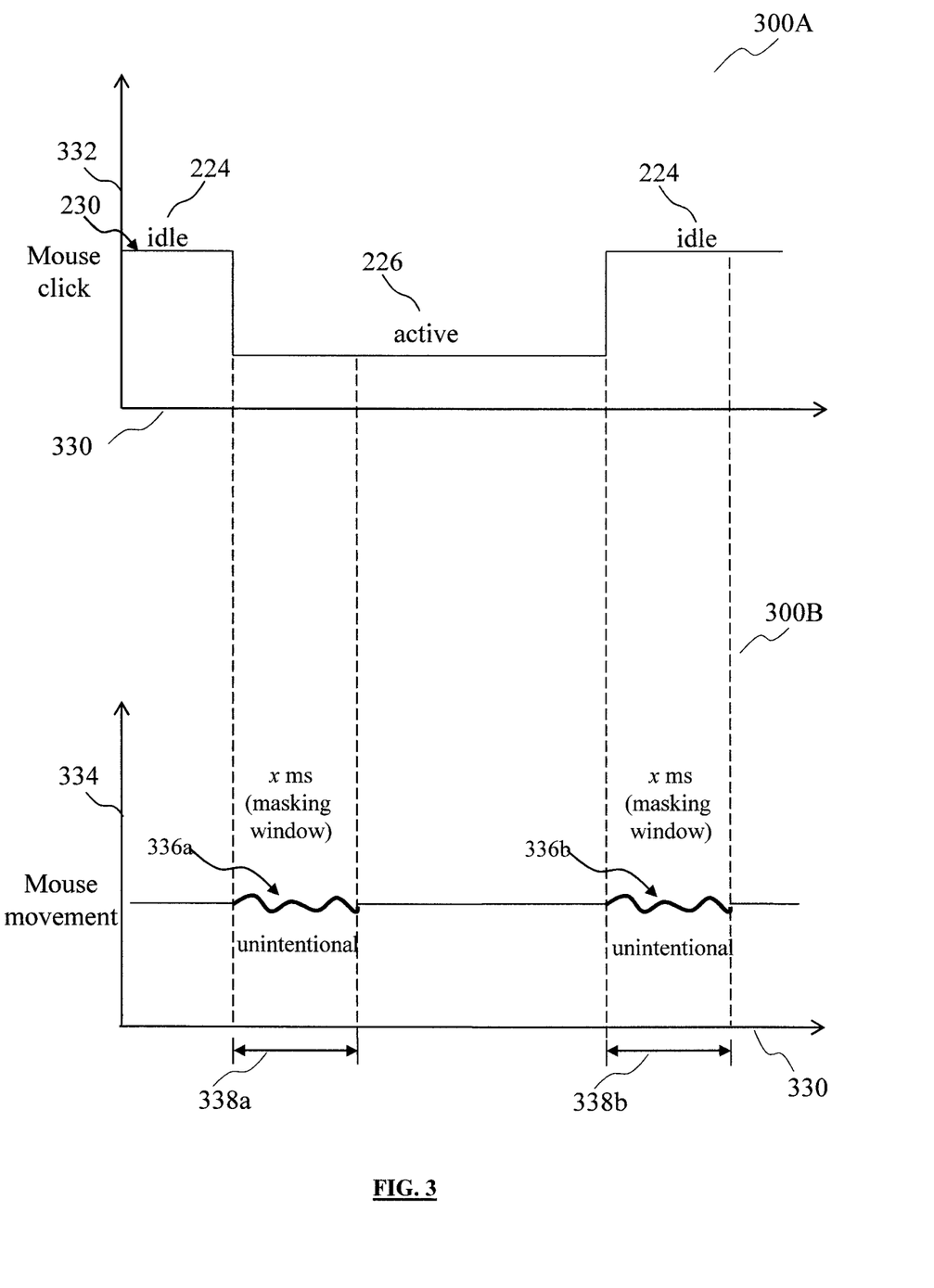
FIG. 3 shows a signal diagram of the control signal and a graph showing computer mouse movement when the button is operated, according to various embodiments.

FIG. 3 shows a signal diagram 300A of the control signal 230 and a graph 300B showing computer mouse movement when the button 116 is operated, according to various embodiments. The graph 300B shows the computer mouse movement when the user is not consciously moving the pointing device 100. Both the signal diagram 300A and the graph 300B share the same horizontal axis 330 which indicates time. The signal diagram 300A includes vertical axis 332 indicating amplitude of the control signal 230. The graph 300B includes vertical axis 334 indicating movement of the pointing device 100. When the control signal 230 transits from the idle state 224 to the active state 226, the pointing device 100 may inadvertently move (shown as unintentional movement 336a), possibly due to imprecise control of the pointing device 100 by the user, or elastic forces within the pointing device 100. Similarly, when the control signal 230 transits from the active state 226 to the idle state 224, the pointing device 100 may inadvertently move (shown as unintentional movement 336*b*). The controller 106 may impose a masking window 338*a* to inhibit transmission of data representing the unintentional movement 336*a* to the computing device. The controller 106 may also impose a masking window 338*b* to inhibit transmission of data representing the unintentional movement 336*b* to the computing device. The masking window 338*a* may be a predetermined time duration immediately after the switch 102 is actuated. The masking window 338*b* may be a predetermined time duration immediately after the switch 102 is deactivated. The masking window 338*a* and the masking window 338*b* may be identical or similar in time duration. Alternatively, the masking window 338*a* and the masking window 338*b* may be different in time duration. During the masking windows 338*a*, 338*b*, the movements of the pointing device 100 are not reported to the transmitter 110.

Figure 4:
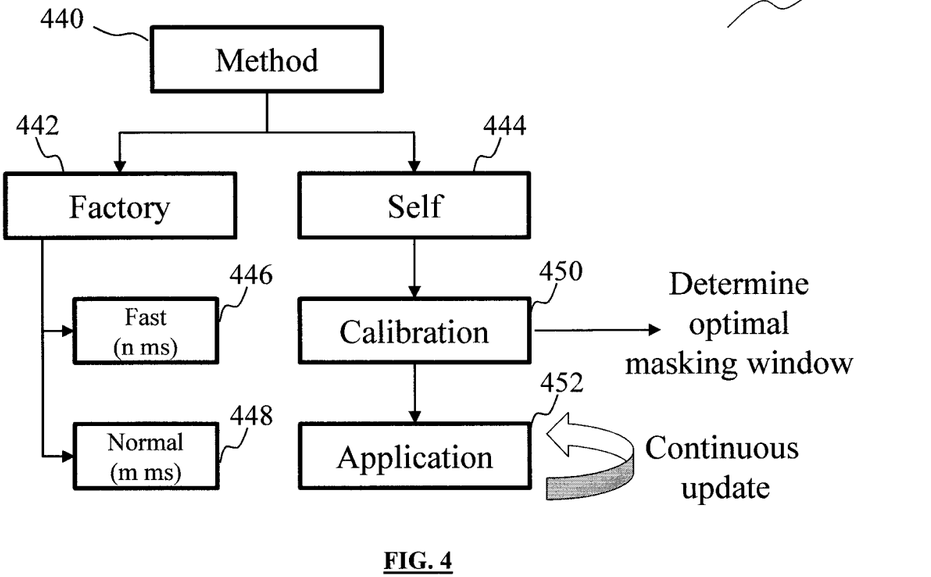
FIG. 4 shows a flow chart of a process of determining the time duration of the masking window, according to various embodiments.

FIG. 4 shows a flow chart 400 of a process of determining the time duration of the masking window 338*a* or 338*b*, according to various embodiments. In step 440, a user of the pointing device 100 may select a method for determining the time duration of the masking window. The user may select the method using the user interface 114. The selectable methods may include the factory settings method 442 or the self-learning method 444. Under the factory settings method 442, the user may use the user interface 114 to select an operation mode of the pointing device 100. The selectable operation modes may include a fast mode 446 and a normal mode 448. For example, the fast mode 446 may be suitable when the user is using the pointing device 100 for gaming, i.e. to play a computer game on the computing device. For example, the normal mode 448 may be suitable when the user is using the pointing device 100 for performing clerical tasks or office tasks on the computing device. The masking window may be shorter under the fast mode 446, and may be longer under the normal mode 448. The factory settings method 442 may include further selectable operation modes with other time durations for the masking window. The controller 106 may adjust the masking window based on the selected operation mode.

Under the self-learning method 444, the controller 106 may accumulate a predetermined number of button-click events during normal usage by the user, and record the duration of the spatial data during these button-click events. In other words, the controller 106 may control the accumulation of the data on the movement of the pointing device 100 during button-click events. The movements of the pointing device 100 are the (x,y) movements, i.e. the movements of the pointing device 100 in the plane of the tracking surface. The controller 106 may also activate the calibration process 450. Under the calibration process 450, the self-learning processor 118 may determine the optimal masking window duration based on the recorded duration of (x,y) movements. The initial determined masking window duration may be a nominal interval value. After determining the nominal interval value, in application monitoring process 452, the controller 106 may continue to monitor the usage of the mouse for applications, and then feedback the usage information to the self-learning processor 118. The self-learning processor 118 may then update the masking window duration based on the feedback. The continual feedback and updating process may ensure that the masking window duration is optimised for any change of tracking surface. For example, the pointing device 100 may initially be used on a desk which is a hard and even surface. On the hard surface, the unintended (x,y) movements may end within a first time duration. Subsequently, the user may place the pointing device 100 on his lap and slide the pointing device 100 across his lap, when the user is outside of his office. The user's lap may be considered a soft and uneven surface as compared to the desk. On the soft surface, the unintended (x,y) movements may end within a second time duration. The first time duration and the second time duration may be different. By continuously computing the optimal masking window, the self-learning processor 118 may account for the change in tracking surface. The self-learning processor 118 may also receive information that identifies the tracking surface, from the surface identifier 120. The self-learning processor 118 may compute the determined time interval based on the identified tracking surface, or based on both the identified tracking surface and the recorded duration of (x,y) movements.

Figure 5:
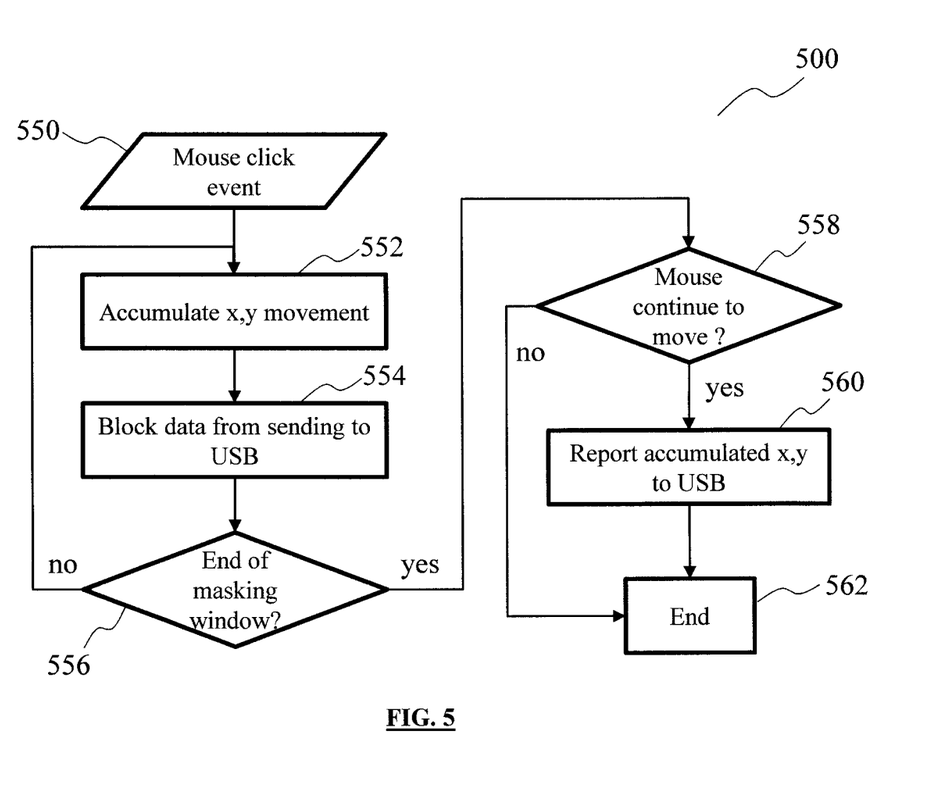
FIG. 5 shows a flow chart showing a process of blocking the unintended spatial data from being sent to the computing device, according to various embodiments.

FIG. 5 shows a flow chart 500 showing a process of blocking the unintended spatial data from being sent to the computing device, according to various embodiments. After the optimal masking window has been determined in the process of flow chart 400, the controller 106 may proceed to the process of the flow chart 500. In step 550, the switch 102 may detect a mouse click event 550. The mouse click event may be a clicking of the button 116, in other words, when the switch 102 is activated; or when the button is released, in other words, when the switch 102 is deactivated. Upon detection of the mouse click event, the process may proceed to step 552, where the memory 108 may accumulate the (x,y) movement. After that, in step 554, the controller 106 may the block spatial data from being sent to the transmitter 110. In step 556, the controller 106 may determine whether the masking window has come to an end, or has not come to an end. If the controller 106 determines that the masking window has not yet ended, the controller 106 may return to step 552 to continue accumulating the (x,y) movement. If the controller 106 determines that the masking window has ended, the step may proceed to step 558. In step 558, the motion sensor 104 may determine if the housing 112 is still moving. For example, the user may be moving the pointing device 100 and depressing the button 116 at the same time, i.e. click-and-move, to perform a drag-and-drop operation in the graphical user interface. In other words, the movements of the pointing device 100 may be intentional instead of unintentional, and thus, should not be ignored. If the housing 112 is still moving, the controller 106 may report the accumulated movements to the transmitter 110, under the step 560. In other words, when click-and-move is detected, the transmitter 110 may resubmit the "dropped" data to an operating system on the computing device. After that, the step may end at step 562. If the housing 112 is not moving, the process may come to an end in step 562.

While the flow charts 400 and 500 are explained herein in relation to the pointing device 100 as an illustrative example, the methods shown in the flow charts 400 and 500 are not limited to being used on the pointing device 100. The methods shown in the flow charts 400 and 500 are also applicable to all pointing devices according to various embodiments. Further embodiments of the pointing device are described in the following paragraphs.

Figure 6:
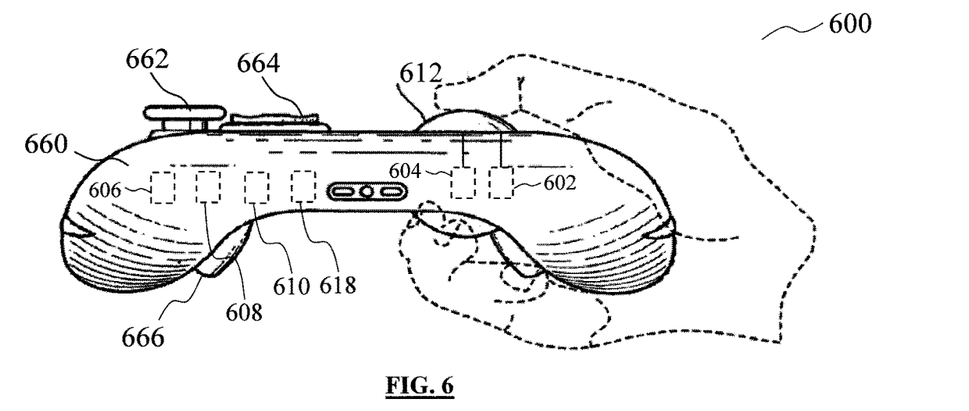
FIG. 6 shows a pointing device according to various embodiments.

FIG. 6 shows a pointing device 600 according to various embodiments. The pointing device 600 may be a game controller, or may also be referred to as a trackball device. The pointing device 600 may be coupled to a computing device. A user may use the pointing device 600 to control an application running on the computing device, in particular, through a GUI of the application. The pointing device 600 may be similar to the pointing device 100 in that it may also include a switch 602, a motion sensor 604 and a controller 606. The switch 602 may be identical to, or at least substantially similar to the switch 102. The motion sensor 604 may perform at least substantially the same function as the motion sensor 104, i.e. to generate spatial data based on movements of a moveable part. The controller 606 may be identical to, or at least substantially similar to, the controller 106. The pointing device 600 may include a trackball 612. The trackball 612 may be the moveable part that the motion sensor 604 tracks. The trackball 612 may be rollable. The motion sensor 604 may track the angle and direction of rotation of the trackball 612, and may generate the spatial data based on the angle and direction of rotation. The trackball 612 may be a clickable trackball. The trackball 612 may also serve as a button, similar to the button 116, in that it may be depressed or may receive an external force, to actuate the switch 602. The switch 602 may generate a control signal when the trackball 612 is depressed. When a user of the pointing device 600 clicks the trackball 612, he may inevitably cause the trackball to rotate, even though he does not intend to provide any spatial input to the computing device. This unintentional rotation of the trackball 612 may therefore, be undesirable. The pointing device 600 may further include a memory 608, a transmitter 610 and a self-learning processor 618. The memory 608, the transmitter 610 and the self-learning processor 618 may be identical to, or at least substantially similar to the memory 108, the transmitter 110 and the self-learning processor 118 respectively. When the control signal generated by the switch 602 exhibits a change in state, indicating that the switch is being activated or de-activated, the controller 606 may halt the transmission of the spatial data to the computing device, for a predetermined time interval following the change in state of the control signal. During normal operation, i.e. when the trackball 612 is being rolled without being simultaneously clicked, the transmitter 610 may transmit the spatial data to the computing device. When the controller 606 detects the change in state of the control signal, the controller 606 may control the transmitter to stop operations for the predetermined time interval. During the predetermined time interval, the controller 606 may control the memory 608 to store the spatial data. After the predetermined time interval, the controller 606 may check whether the motion sensor 604 is still reporting rotation of the trackball 612, or not. If the motion sensor 604 reports that the trackball 612 is still rotating, the controller 606 may control the transmitter 610 to retrieve the spatial data stored in the memory 608 and transmit the retrieved spatial data to the computing device. Other than the trackball 612, the pointing device 600 may also include other types of input receiving units such as click buttons, thumbstick 662, directional-pad 664 and trigger 666. Any one of the input receiving units may serve as a user interface, similar to the user interface 114. The input receiving units may receive a user input for selecting an operation mode. Alternatively, the operation mode may be selectable through a selection menu on a graphical user interface of the computing device. The controller 606 may determine the predetermined time interval based on the operation mode. The controller 606 may alternatively receive the predetermined time interval from the self-learning processor 618. The self-learning processor 618 may compute an optimal value for the predetermined time interval by collecting usage data over a plurality of state change cycles of the control signal, or even over a prolonged usage duration. The self-learning processor 618 may be configured to run a machine-learning algorithm on the collected usage data, to identify the most likely time duration of an unintended rotation of the trackball 612 after a click or un-click operation of the trackball 612. The input receiving units may be arranged on an exterior surface of a casing 660. The casing 660 may also at least partially enclose internal components including the switch 602, the motion sensor 604, the controller 606, the memory 608, the transmitter 610 and the self-learning processor 618. The casing 660 may protect the internal components from environmental elements such as humidity, dust and heat, as well as from excessive vibration and shock. The internal components are illustrated in dashed lines in FIG. 6 to indicate that they may not be visible by virtue of being enclosed in the casing 660. The positions of the various internal components shown in FIG. 6 are merely illustrative and are not limiting as to the position of the internal components.

Figure 7:
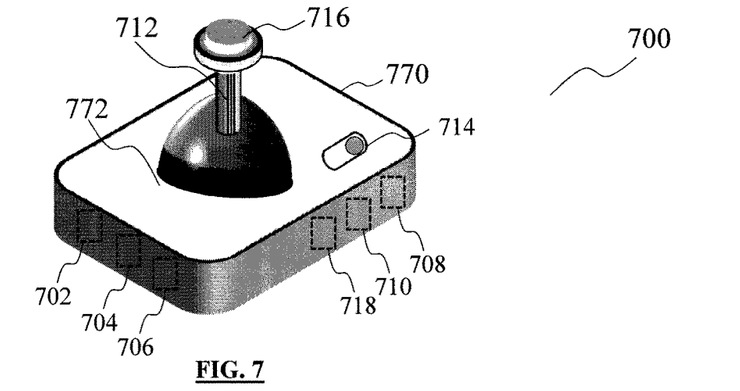
FIG. 7 shows a pointing device according to various embodiments.

FIG. 7 shows a pointing device 700 according to various embodiments. The pointing device 700 may be a joystick, also referred to as a stick controller device, or a thumbstick. Similar to the pointing devices 100 and 600, the pointing device 700 may be coupled to a computing device. The pointing device 700 may be similar to the pointing devices 100 and 600, in its function of providing a user with the means to control a cursor or an item in the space of a GUI running on the computing device. The pointing device 700 may also include a switch 702, a motion sensor 704 and a controller 706, similar to the pointing devices 100 and 600. The pointing device 700 may further include a moveable part 712, in the form of a stick or a stick controller. The moveable part 712 may be pivotable about a base 772. The motion sensor 704 may detect the pivoting motion of the moveable part 712, and may generate spatial data based on the detected pivoting motion. Similar to the pointing devices 100 and 600, the pointing device 700 may also include a memory 708, a transmitter 710, a button 716, a user interface 714 and a self-learning processor 718. At least one of the memory 708, the transmitter 710, the button 716, the user interface 714 or the self-learning processor 718 may be enclosed in a chassis 770. The base 772 may be part of the chassis 770. The transmitter 710 may transmit the spatial data generated by the motion sensor 704, to the computing device for shifting a position of control in the space of the GUI (e.g. a cursor position). The button 716 may be operable, to activate the switch 702. For example, when the button 716 is depressed or pushed, the button 716 may cause the electrical contacts in the switch 702 to come into contact to close an electrical circuit. When the button 716 is released from external force, the switch 702 may be deactivated. When a user pushes the button 716, the pushing force may include horizontal components that cause the moveable part 712 to pivot about the base 772, even if the user does not intend to pivot the moveable part 712. Similarly, when the button 716 is released, the moveable part 712 may also pivot about the base 772. As such, the computing device may receive accidental spatial data and thereby register a movement of the cursor in the GUI. To prevent the unintentional movement of the cursor, the controller 706 may be configured to block off transmission of the spatial data to the computing device for a predetermined time interval, for example by controlling the transmitter 710. The predetermined time interval may take place immediately after a change in the state of the control signal, i.e. when the control signal changes from low to high, or from high to low. The user may select an operation mode of the pointing device 700 using a user interface 714. The user interface 714 may be a physical input receiving unit, such as a slider or a button, or may alternatively be a virtual menu presented on the display of the computing device. The operation modes may correspond to factory settings of the predetermined time interval. Instead of the factory settings, the controller 706 may also obtain the predetermined time interval from the self-learning processor 718. The self-learning processor 718 may be an intelligent statistical module that computes an optimal value for the predetermined time interval based on spatial data collected over various cycles of the control signal.

Figure 8:
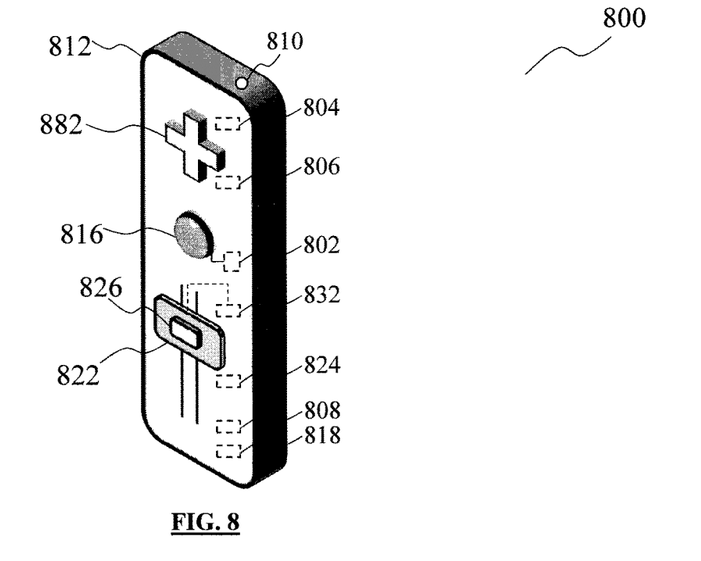
FIG. 8 shows a pointing device according to various embodiments.

FIG. 8 shows a pointing device 800 according to various embodiments. The pointing device 800 may be a remote controller or a game controller, for example like the Nintendo Wii Remote. The pointing device 800 may be similar to the pointing devices 100, 600 and 700, in that it may be configured to receive user inputs and may be further configured to manipulate items on the GUI of a computing device based on the received user inputs. The pointing device 800 may include a housing 812 for enclosing internal components, a plurality of input receiving units, and a plurality of internal components. The plurality of input receiving units may include buttons, such as a directional-pad 882, a button 816 and a slider mechanism. The slider mechanism may include a slidable part 822 and may further include a depressible part 826. The plurality of internal components may include a first switch 802, a second switch 832, a first motion sensor 804, a second motion sensor 824 and a controller 806. The plurality of internal components may also include a memory 808, a transmitter 810 and a self-learning processor 818. The first motion sensor 804 and the second motion sensor 824 may be configured to sense movement of respective moveable parts. The moveable part may be the entire pointing device 800 or the housing 812. The first motion sensor 804 may generate a first spatial data based on the movement of the housing 812. The transmitter 810 may be configured to transmit the first spatial data to the computing device. The computing device may then interpret the first spatial data into changes in the GUI. For example, a user may swing the housing 812 to cause an item in the GUI to move in the same direction as the swinging of the housing 812. When the user clicks the button 816, the button 816 may activate the first switch 802. When the user releases the button 816, the button 816 may deactivate the first switch 802. The first switch 802 may generate a first control signal that changes its state depending on whether the first switch 802 is activated or deactivated. Upon each change of state in the first control signal, the controller 806 may temporarily freeze transmission of the first spatial data to the computing device. The time duration of freezing the transmission of the first spatial data may be referred herein as the first masking window. The first masking window may be determined based on an operation mode of the pointing device 800, or may be computed by the self-learning processor 818. During the first masking window, the controller 806 may route the first spatial data to the memory 808 for temporary storage. If the housing 812 continues to move even after the first masking window, the controller 806 may control the transmitter 810 to transmit the first spatial data that was temporarily stored in the memory 808. If the housing 812 does not move after the first masking window, the controller 806 may command the memory 808 to discard or overwrite the temporarily stored first spatial data.

The moveable part may also refer to the slidable part 822. The second motion sensor 824 may sense the sliding of the slidable part 822, and generate a second spatial data based on the sliding of the slidable part 822. The second switch 832 may be configured to sense operation of the depressible part 826. When the user clicks the depressible part 826, the second switch 832 may generate a second control signal. The second control signal may be in an active state when the depressible part 826 is depressed. When the user releases pressure on the depressible part 826, the second switch 832 may change the state of the second control signal to an idle state. Upon each change of state in the second control signal, the controller 806 may temporarily freeze transmission of the second spatial data to the computing device. The time duration of freezing the transmission of the second spatial data may be referred herein as the second masking window. The second masking window may be determined based on an operation mode of the pointing device 800, or may be computed by the self-learning processor 818. During the second masking window, the controller 806 may route the second spatial data to the memory 808 for temporary storage. If the slidable part 822 continues to move even after the second masking window, the controller 806 may control the transmitter 810 to transmit the second spatial data that was temporarily stored in the memory 808. If the slidable part 822 does not slide after the second masking window, the controller 806 may command the memory 808 to discard or overwrite the temporarily stored second spatial data.

According to various embodiments, in deciding whether to retrieve the temporarily stored spatial data in the memory or not, the controller 806 may also determine whether the motion sensor detects a sudden change in movement of the moveable part immediately after the masking window or not. If the motion sensor detects a sudden change in movement of the moveable part, for example a change in direction or a sudden increase in displacement beyond a predetermined threshold, as compared to the movements of the moveable part during the masking window, the controller 806 may determine that the movements of the moveable part during the masking window are not related to the movements of the moveable part after the masking window. In other words, the movements of the moveable part detected during the clicking of the button may be unintentional while the movements of the moveable part subsequently may be intentional. The controller may thus still discard the temporarily stored spatial data, even though the motion sensor continues to generate spatial data after the masking window. If the motion sensor continues to detect movement of the moveable part, but the movement is in the same direction as the movement during the masking window or is within the predetermined threshold, the controller 806 may determine that the movements during the masking window and after the masking window belong to a single sequence of continuous movement. In other words, the user may be consciously moving the moveable part while operating the button, for example to execute a drag-and-drop operation in the GUI. Therefore, the controller 806 may retrieve the temporarily stored spatial data from the memory and direct the transmitter to transmit the stored spatial data to the computing device.

According to various embodiments, a computing device may be provided. The computing device may be communicatively coupled to a conventional pointing device, such as a computer mouse. The computing device may be configured to receive spatial data from the pointing device, as well as control signals from the pointing device. The spatial data may be indicative of a position of a moveable part of the pointing device or the position of the pointing device itself. The control signal may be indicative of an operation or activation status of a switch of the pointing device. The computing device may display a cursor on a display device such as a computer monitor. The computing device may translate the received spatial data into position of the cursor. However, when the computing device detects a state change in the control signal, or receives a command from the pointing device that corresponds to state change in the control signal, the computing device may cease translating the spatial data into the cursor position for a predetermined time interval immediately following the state change in the control signal. Instead, the computing device may temporarily store the spatial data received during the predetermined time interval in a cache, for example a memory like a random access memory. If the computing device continues to receive new spatial data after the predetermined time interval, the computing device may retrieve the temporarily stored spatial data and may proceed to translate the spatial data into the cursor position. If the computing device does not receive any new spatial data after the predetermined time interval, the computing device may clear the cache of the temporarily stored spatial data. The computing device may include a non-transitory computable readable medium storing instructions, that when executed by the computing device, causes the computing device to perform the above described processes. The computer readable medium may reside in a computing device, for example, on a memory or a hard disk of the computing device.

Figure 9:
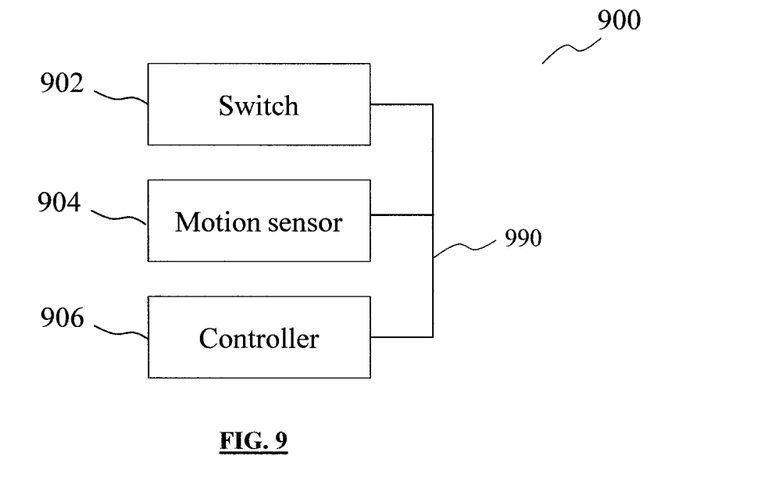
FIG. 9 shows a conceptual diagram of a pointing device for communicating with a computing device, according to various embodiments.

FIG. 9 shows a conceptual diagram of a pointing device 900 for communicating with a computing device, according to various embodiments. The pointing device 900 may be any one of the pointing devices 100, 600, 700 or 800. The pointing device 900 may be used to communicate with a computing device. The pointing device 900 may include a switch 902, a motion sensor 904 and a controller 906. The switch 902 may be any one of the switches 102, 602, 702, first switch 802 or second switch 832. The switch 902 may be operable to generate a control signal. The motion sensor 904 may be any one of the motion sensors 104, 604, 704, first motion sensor 804 or second motion sensor 824. The motion sensor 904 may be configured to generate spatial data based on movements of a moveable part of the pointing device 900. The controller 906 may be any one of the controllers 106, 606, 706 or 806. The controller 906 may be configured to inhibit transmission of the spatial data to the computing device, during a predetermined time interval immediately following any state changes in the control signal. The switch 902, the motion sensor 904, and the controller 906 may be coupled with each other, like indicated by lines 990, for example electrically coupled, for example using a line or a cable, and/or mechanically coupled.

In other words, according to various embodiments, a pointing device 900 for communicating with a computing device, may be provided. The pointing device 900 may include a switch 902 that may be operated to provide a control signal. The switch 902 may be an electrical switch, and the control signal may be an electrical signal. For example, the electrical signal may be represented by power, voltage or electrical current. The control signal may change state between an idle state and an active state based on operation of the switch 902. The pointing device 900 may further include a motion sensor 904. The motion sensor 904 may be configured to generate spatial data based on movements of a moveable part of the pointing device 900. The spatial data may be indicative of movements of the moveable part. The spatial data may represent a user input, in other words, convey the user's commands to the computing device. The spatial data may be provided to the computing device, to control a cursor displayed on a monitor of the computing device, or part of an application being run on the computing device. The controller 906 may be configured to block transmission of the spatial data to the computing device during a specific time window. The specific time window may be a predetermined time interval immediately after any state changes in the control signal. State changes in the control signal may include a state change from active state to idle state; and a state change from idle state to active state. In other words, the pointing device 900 may transmit spatial data to the computing device at all times, other than during the specific time window.

Figure 10:
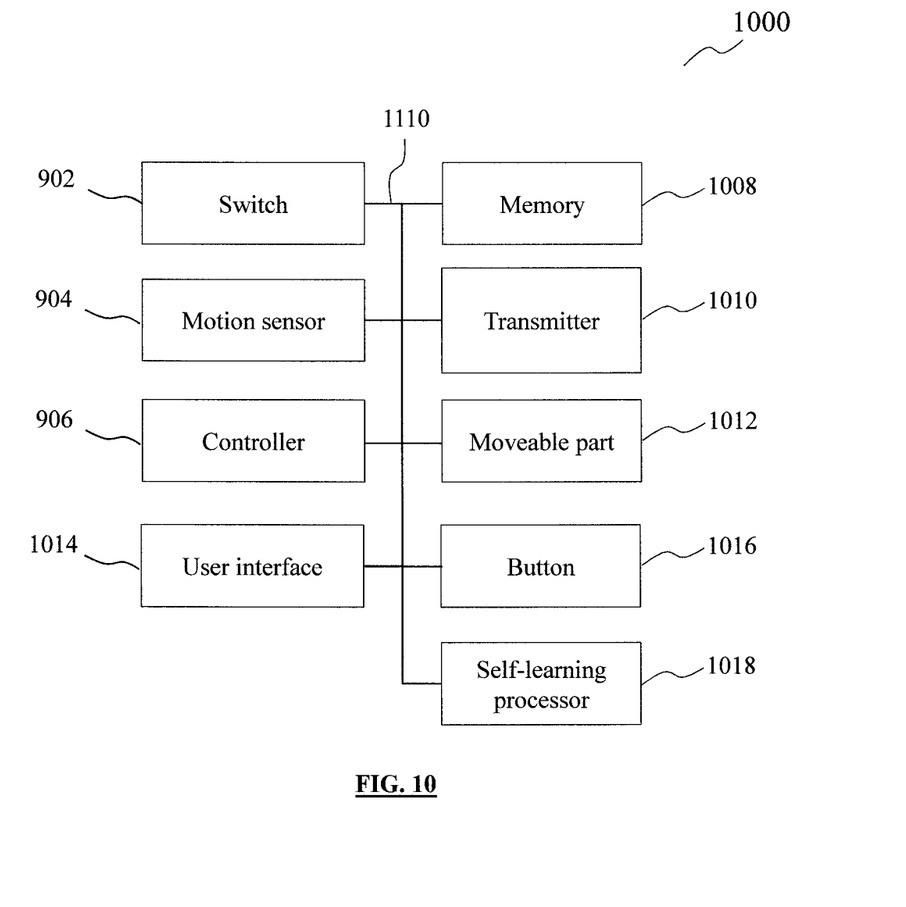
FIG. 10 shows a conceptual diagram of a pointing device for communicating with a computing device, according to various embodiments.

FIG. 10 shows a conceptual diagram of a pointing device 1000 for communicating with a computing device, according to various embodiments. The pointing device 1000 may be any one of the pointing devices 100, 600, 700, 800 or 900. The pointing device 1000 may be similar to the pointing device 900, in that it may include the switch 902, the motion sensor 904 and the controller 906. The pointing device 1000 may include a moveable part 1012. The motion sensor 904 may generate the spatial data based on movements of the moveable part 1012. The moveable part 1012 may be any one of the housing 112, trackball 612, moveable part 712, housing 812 or slidable part 822. In addition, the pointing device 1000 may also include a memory 1008. The memory 1008 may be any one of the memories 108, 608, 708 or 808. The memory 1008 may be configured to store the spatial data that is inhibited from being transmitted to the computing device. During the specific time window where the spatial data is inhibited from being transmitted to the computing device, the spatial data may be routed to the memory 1008, instead of a communication channel between the pointing device 1000 and the computing device. The controller 906 may be further configured to activate transmission of the spatial data stored in the memory 1006 to the computing device, if the motion sensor 904 continues to generate spatial data after the predetermined time interval and before a further state change in the control signal. In other words, if controller 906 determines that the new state of the control signal persists longer than the predetermined time interval, the controller 906 routes the stored spatial from the memory 1008 to the communication channel between the pointing device 1000 and the computing device. For example, if a user is using the pointing device 1000 to perform a drag-and-drop operation on the GUI of the computing device, the user may intentionally operate the switch 902 for a longer time than the predetermined time interval, while concurrently moving the moveable part. The controller 1006 may then determine that the movements of the moveable part during the operation of the switch 902 were valid and thereby direct the spatial data corresponding to those valid movements which were stored in the memory 1006, to be transmitted to the computing device. Also for example, the user may deactivate the switch 902 and concurrently displace the moveable part to shift the position of an onscreen cursor. The controller 1006 may determine that the movements of the moveable following the state change of the control signal from high to low, are intentional since the moveable part continues to move even after the predetermined time interval. As a result, the controller 1006 may release the stored spatial data from the memory 1006 to the computing device. The pointing device 1000 may also include a transmitter 1010 configured to transmit each of the spatial data and the control signal to the computing device. The transmitter 1010 may be any one of the transmitters 110, 610, 710 or 810. The transmitter 1010 may establish or provide the communication channel between the pointing device 1000 and the computing device. The pointing device

1000 may also include the moveable part 1012. The pointing device 1000 may also include a button 1016. The button 1016 may be any one of the buttons 116, 616, 716, 816 or depressible part 826. The button 1016 may be depressible to activate the switch 902. The pointing device 1000 may further include a user interface 1014 for selecting an operation mode. The user interface 1014 may be any one of the user interface 114, the thumbstick 662, the directional-pads 664 or 882, the trigger 666, a virtual menu running on the computing device or the user interface 714. The controller 906 may adjust the predetermined time interval based on the selected operation mode. The pointing device 1000 may also include a self-learning processor 1018 configured to compute the predetermined time interval based on spatial data accumulated during a plurality of state change cycles of the control signal. The self-learning processor 1018 may be any one of the self-learning processors 118, 618, 718 or 818. The self-learning processor 1018 may be further configured to continuously adjust the predetermined time interval as more spatial data is accumulated during normal usage of the pointing device 1000. The switch 902, the motion sensor 904, the controller 906, the memory 1008, the transmitter 1010, the moveable part 1012, the user interface 1014, the button 1016, and the self-learning processor 1018 may be coupled with each other, like indicated by lines 1110, for example electrically coupled, for example using a line or a cable, and/or mechanically coupled.

According to various embodiments, the pointing device may be any type of pointing device that provides spatial data to a computing device, where the spatial data corresponds to a movement of a moveable part of the pointing device. The moveable part may be the entire physical structure of the pointing device. The pointing device may include a switch that is activatable to send a command signal to the computing device. The switch, or a button that activates the switch, may be physically coupled to the moveable part such that operating of the switch may cause the moveable part to move.

Figure 11:
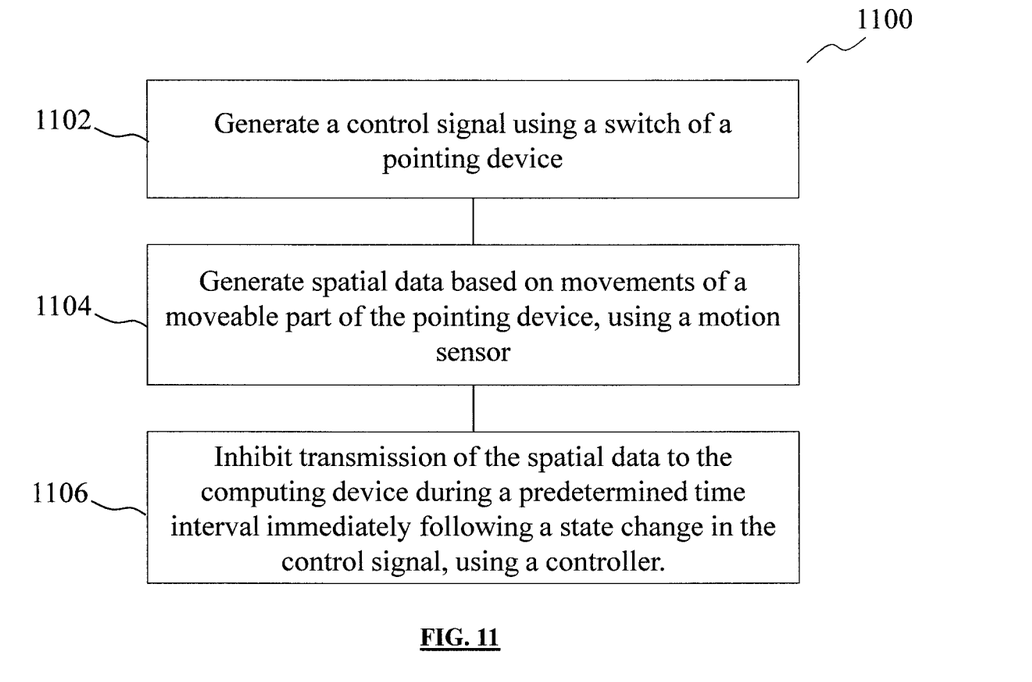
FIG. 11 shows a flow diagram of a method for providing user inputs to a computing device, according to various embodiments.

FIG. 11 shows a flow diagram 1100 of a method for providing user inputs to a computing device, according to various embodiments. In 1102, a switch of a pointing device may generate a control signal. In 1104, a motion sensor may generate spatial data based on movements of a moveable part of the pointing device. In 1106, a controller may inhibit transmission of the spatial data to the computing device during a predetermined time interval immediately following a state change in the control signal. The process in 1106 may be identical to, or at least substantially similar to the step 554.

According to various embodiments, a non-transitory computer readable medium may be provided. The non-transitory computer readable medium may include instructions which, when executed by a processor, causes the processor to perform a method for providing user inputs from a pointing device to a computing device. The method may be identical to, or similar to the method shown in the flow diagram 1100.

Figure 12:
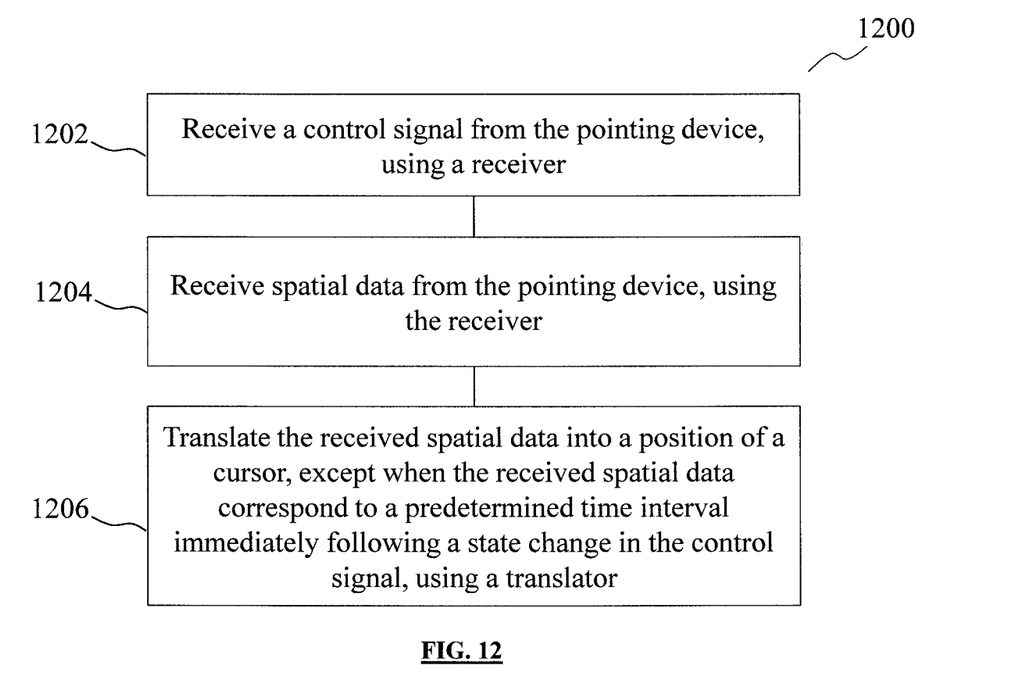
FIG. 12 shows a flow diagram of a method for receiving user inputs from a pointing device, according to various embodiments.

FIG. 12 shows a flow diagram 1200 of a method for receiving user inputs from a pointing device, according to various embodiments. In 1202, a receiver may receive a control signal from the pointing device. In 1204, the receiver may receive spatial data from the pointing device. In 1206, a translator may translate the received spatial data into a position of a cursor, except when the received spatial data correspond to a predetermined time interval immediately following a state change in the control signal.

According to various embodiments, a non-transitory computer-readable medium may be provided. The non-transitory computer-readable medium may include instructions which, when executed by a computer, causes the computer to perform the method shown in FIG. 12.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The following examples pertain to further embodiments.

Example 1 is a pointing device for communicating with a computing device, the pointing device including: a switch operable to generate a control signal; a motion sensor configured to generate spatial data based on movements of a moveable part of the pointing device; a controller configured to inhibit transmission of the spatial data to the computing device, during a predetermined time interval immediately following a state change in the control signal.

In example 2, the subject-matter of example 1 can optionally include a memory configured to store the spatial data that is inhibited from being transmitted to the computing device.

In example 3, the subject-matter of example 2 can optionally include the controller is further configured to activate transmission of the stored spatial data to the computing device, if the motion sensor continues to generate spatial data after the predetermined time interval and before a further state change in the control signal.

In example 4, the subject-matter of any one of examples 1 to 3 can optionally include that the control signal changes state between an idle state and an active state based on operation of the switch.

In example 5, the subject-matter of any one of examples 1 to 4 can optionally include a transmitter configured to transmit each of the spatial data and the control signal to the computing device.

In example 6, the subject-matter of any one of examples 1 to 5 can optionally include the moveable part.

In example 7, the subject-matter of any one of examples 1 to 6 can optionally include that the pointing device is a computer mouse.

In example 8, the subject-matter of example 7 can optionally include that a housing enclosing at least one of the motion sensor, the switch and the controller; wherein the housing is the moveable part.

In example 9, the subject-matter of any one of examples 1 to 7 can optionally include that the pointing device includes a trackball, wherein the trackball is the moveable part.

In example 10, the subject-matter of any one of examples 1 to 7 can optionally include that the moveable part is a stick of a joystick.

In example 11, the subject-matter of any one of examples 1 to 10 can optionally include a button depressible to activate the switch.

In example 12, the subject-matter of any one of examples 1 to 11 can optionally include a user interface for selecting an operation mode, wherein the controller adjusts the predetermined time interval based on the selected operation mode.

In example 13, the subject-matter of any one of examples 1 to 12 can optionally include a self-learning processor configured to compute the predetermined time interval based on spatial data accumulated during a plurality of state change cycles of the control signal.

In example 14, the subject-matter of example 13 can optionally include that the self-learning processor is further configured to continuously adjust the predetermined time interval as more spatial data is accumulated during normal usage of the pointing device.

In example 15, the subject-matter of examples 13 or 14 can optionally include that a surface identifier configured to identify a surface on which the moveable part moves across, wherein the self-learning processor is configured to compute the determined time interval further based on the identified surface.

In example 16, the subject-matter of examples 14 or 15 can optionally include that the surface identifier includes an image recognizer.

In example 17, the subject-matter of any one of examples 14 to 16 can optionally include that the surface identifier is configured to identify patterns in the accumulated spatial data.

Example 18 is a method for providing user inputs to a computing device, the method including: generating a control signal using a switch of a pointing device; generating spatial data based on movements of a moveable part of the pointing device, using a motion sensor; inhibiting transmission of the spatial data to the computing device during a predetermined time interval immediately following a state change in the control signal, using a controller.

Example 19 is a non-transitory computer-readable medium including instructions which, when executed by a processor, causes the processor to perform a method for providing user inputs to a computing device, the method including: generating a control signal using a switch of a pointing device; generating spatial data based on movements of a moveable part of the pointing device, using a motion sensor; inhibiting transmission of the spatial data to the computing device during a predetermined time interval immediately following a state change in the control signal.

Example 20 is a non-transitory computer-readable medium including instructions which, when executed by a computer, causes the computer to perform a method for receiving user inputs from a pointing device, the method including: receiving a control signal from the pointing device; receiving spatial data from the pointing device; translating the received spatial data into a position of a cursor, except when the received spatial data correspond to a predetermined time interval immediately following a state change in the control signal.

The invention claimed is:

1. A pointing device for communicating with a computing device, the pointing device comprising:
   a switch operable to generate a control signal;
   a motion sensor configured to generate spatial data, configured to control a position of a cursor, based on movements of a moveable part of the pointing device;
   a controller configured to inhibit transmission of the spatial data to the computing device, during a predetermined time interval immediately following a state change in the control signal upon activating the switch;
   a memory configured to store the spatial data that is inhibited from being transmitted to the computing device;
   wherein the controller is further configured to activate transmission of the stored spatial data to the computing device after the predetermined time interval so as to control the position of the cursor based on the stored spatial data if the motion sensor continues to generate spatial data based on movements of the moveable part and if the switch remains activated after the predetermined time interval and before a further state change in the control signal,
   wherein the control signal changes state between an idle state and an active state based on operation of the switch;
   wherein the controller is further configured to discard the stored spatial data if the motion sensor determines that the moveable part is stationary after the predetermined time interval.

2. The pointing device of claim 1, further comprising:
   a transmitter configured to transmit each of the spatial data and the control signal to the computing device.

3. The pointing device of claim 1, further comprising:
   the moveable part.

4. The pointing device of claim 1, wherein the pointing device is a computer mouse.

5. The pointing device of claim 4, further comprising:
   a housing enclosing at least one of the motion sensor, the switch and the controller;
   wherein the housing is the moveable part.

6. The pointing device of claim 1, wherein the pointing device comprises a trackball, wherein the trackball is the moveable part.

7. The pointing device of claim 1, wherein the moveable part is a stick of a joystick.

8. The pointing device of claim 1, further comprising:
   a button depressible to activate the switch.

9. The pointing device of claim 1, further comprising:
   a user interface for selecting an operation mode, wherein the controller adjusts the predetermined time interval based on the selected operation mode.

10. The pointing device of claim 1, further comprising:
    a self-learning processor configured to compute the predetermined time interval based on spatial data accumulated during a plurality of state change cycles of the control signal.

11. The pointing device of claim 10, wherein the self-learning processor is further configured to continuously adjust the predetermined time interval as more spatial data is accumulated during normal usage of the pointing device.

12. The pointing device of claim 10, further comprising:
    a surface identifier configured to identify a surface on which the moveable part moves across,
    wherein the self-learning processor is configured to compute the predetermined time interval further based on the identified surface.

13. The pointing device of claim 12, wherein the surface identifier comprises an image recognizer.

14. The pointing device of claim 12, wherein the surface identifier is configured to identify patterns in the accumulated spatial data.

15. The pointing device of claim 1,
    wherein the controller is further configured to discard the stored spatial data if the motion sensor determines, after the predetermined time interval, an increase in displacement of the moveable part beyond a predetermined threshold as compared to movement of the moveable part during the predetermined time interval.

16. The pointing device of claim 1,
    wherein the controller is further configured to discard the stored spatial data if the motion sensor determines, after the predetermined time interval, a change in direction of the moveable part as compared to movement of the moveable part during the predetermined time interval.

17. A method for providing user inputs to a computing device, the method comprising:
generating a control signal using a switch of a pointing device;
generating spatial data, configured to control a position of a cursor, based on movements of a moveable part of the pointing device, using a motion sensor;
inhibiting transmission of the spatial data to the computing device during a predetermined time interval immediately following a state change in the control signal upon activating the switch, using a controller;
storing the spatial data that is inhibited from being transmitted to the computing device by a memory;
activating transmission of the stored spatial data to the computing device after the predetermined time interval so as to control the position of the cursor based on the stored spatial data if the motion sensor continues to generate spatial data based on movements of the moveable part and if the switch remains activated after the predetermined time interval and before a further state change in the control signal,
wherein the control signal changes state between an idle state and an active state based on operation of the switch;
discarding the stored spatial data, using the controller, if the motion sensor determines that the moveable part is stationary after the predetermined time interval.

18. A non-transitory computer-readable medium comprising instructions which, when executed by a processor, causes the processor to perform a method for providing user inputs to a computing device, the method comprising:
generating a control signal using a switch of a pointing device;
generating spatial data, configured to control a position of a cursor, based on movements of a moveable part of the pointing device, using a motion sensor;
inhibiting transmission of the spatial data to the computing device during a predetermined time interval immediately following a state change in the control signal upon activating the switch;
storing the spatial data that is inhibited from being transmitted to the computing device by a memory;
activating transmission of the stored spatial data to the computing device after the predetermined time interval so as to control the position of the cursor based on the stored spatial data if the motion sensor continues to generate spatial data based on movements of the moveable part of the pointing device and if the switch remains activated after the predetermined time interval and before a further state change in the control signal,
wherein the control signal changes state between an idle state and an active state based on operation of the switch;
discarding the stored spatial data if the motion sensor determines that the moveable part is stationary after the predetermined time interval.

19. A non-transitory computer-readable medium comprising instructions which, when executed by a computer, causes the computer to perform a method for receiving user inputs from a pointing device, the method comprising:
receiving a control signal from the pointing device;
receiving spatial data, configured to control a position of a cursor, from the pointing device, except when the spatial data correspond to a predetermined time interval immediately following a state change in the control signal upon activating a switch of the pointing device;
receiving the spatial data corresponding to the predetermined time interval immediately following the state change in the control signal from the pointing device after the predetermined time interval so as to control the position of the cursor based on the spatial data corresponding to the predetermined time interval immediately following the state change in the control signal if a motion sensor of the pointing device continues to generate spatial data based on movements of a moveable part of the pointing device and if the switch remains activated after the predetermined time interval and before a further state change in the control signal; and
translating the received spatial data into the position of the cursor,
wherein the control signal changes state between an idle state and an active state based on operation of the switch;
discarding the spatial data corresponding to the predetermined time interval immediately following the state change in the control signal if the motion sensor determines that the moveable part is stationary after the predetermined time interval.

* * * * *